United States Patent [19]

Schwarz et al.

[11] 3,755,305

[45] Aug. 28, 1973

[54] PROCESS FOR THE PURIFICATION OF CAPROLACTAM

[75] Inventors: Hans Helmut Schwarz, Krefeld; Otto Immel, Krefeld-Uerdingen, both of Germany

[73] Assignee: Farbenfabricken Bayer Aktiengesellschaft, Leverkusen, Germany

[22] Filed: Apr. 15, 1971

[21] Appl. No.: 134,310

[30] Foreign Application Priority Data

Apr. 22, 1970 Germany................... P 20 19 431.4

[52] U.S. Cl............................................ 260/239.3 A
[51] Int. Cl............................................. C07d 41/06
[58] Field of Search.............................. 260/329.3 A

[56] References Cited
UNITED STATES PATENTS

| | | | |
|---|---|---|---|
| 2,221,369 | 11/1940 | Cass............................ | 260/239.3 A |
| 2,692,878 | 10/1954 | Kahr............................ | 260/239.3 A |
| 2,758,991 | 8/1956 | Kretzers et al............... | 260/239.3 A |
| 2,861,988 | 11/1958 | England....................... | 260/239.3 A |
| 3,476,744 | 11/1969 | Berther et al................ | 260/239.3 A |

Primary Examiner—Henry R. Jiles
Assistant Examiner—Robert T. Bond
Attorney—Plumley & Tyner

[57] ABSTRACT

The invention relates to a process for the purification of $\epsilon$-caprolactam prepared by catalytic cyclohexanone oxime rearrangement in the gaseous phase which comprises mixing the crude lactam at a temperature above its melting point with at least one branched aliphatic hydrocarbon, the mixing proportions ensuring the formation of a liquid lactam phase in addition to the hydrocarbon phase, separating off the hydrocarbon phase, recrystallising the dissolved lactam from the hydrocarbon phase by cooling, and subjecting the lactam crystals thus obtained to fractional vacuum distillation.

4 Claims, 1 Drawing Figure

3,755,305
PATENTED AUG 28 1973
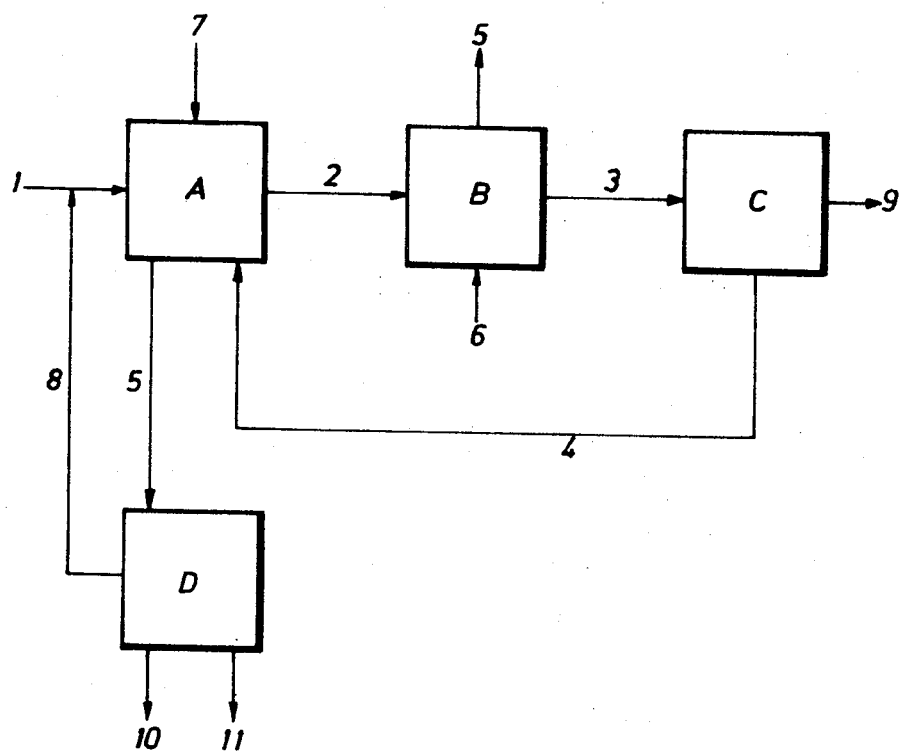
INVENTORS:
HANS HELMUT SCHWARZ, OTTO IMMEL.
BY            ATTORNEYS:
PLUMLEY & TYNER

PROCESS FOR THE PURIFICATION OF CAPROLACTAM

The invention relates to a process for the purification of α-caprolactam prepared by catalytic cyclohexanone oxime rearrangement in the gaseous phase by extraction with branched aliphatic hydrocarbons.

Numerous processes for the production of caprolactam, which has gained great industrial importance as an intermediate for the production of polyamides, have become known. Since the degree of purity of caprolactam is required to be very high, many methods of purification have been developed. It has been found, however, that these processes are generally only suitable for caprolactam which has been prepared by a particular method. Application of these purification processes to lactam which has been obtained by some other synthesis and which therefore has different impurities in many cases does not provide a pure product.

It is explicitly stated in French Patent specification No. 1,490,312 that, although numerous purification processes which can be carried out on an industrial scale are available, they have been developed specifically for lactam obtained by the Beckmann rearrangement. Lactams which have been prepared by some other method, e.g. by the hydrolysis of ω-aminocaproic acid nitrile by the Schmidt reaction or by ammonolysis of ε-caprolactam contain other accompanying materials as impurities according to their method of preparation and therefore require a different method of purification in each case. A method of purifying lactam which has been prepared by ring closing saponification of ω-aminocaproic acid nitrile is disclosed e.g. in German Patent Specification No. 924,213. A process for the purification of caprolactam obtained from ε-caprolactam is described in the French Patent Specification No. 1,420,256 just mentioned. A zinc treatment is recommended in DAS 1,263,772 for the purification of caprolactam which has been obtained by photooximation and rearrangement of cyclohexanone oxime.

The production of caprolactam by catalytic cyclohexanone oxime rearrangement has quite recently gained increasing industrial importance. This process leads to the formation of by-products which are not present in caprolactam produced by the methods of synthesis hitherto used. One result of this is that the methods hitherto known for purifying caprolactam fail when applied to the catalytically produced products.

It is true that in DAS 1,155,132 it is stated that lactam prepared by catalytic rearrangement was purified by the conventional method. The purification process used in this case obviously involved great expenditure and was not satisfactory. Only the permanganate numbers (350 to 510) were given as a measure of the degree of purity. It is generally known, however, that the quality of a lactam depends on a plurality of specific characteristics.

It is an object of this invention to provide a process which avoids the above mentioned disadvantages.

This object is accomplished by a process for the purification of ε-caprolactam prepared by catalytic cyclohexanone oxime rearrangement in the gaseous phase comprising:

I. mixing the crude lactam at a temperature above its melting point with at least one branched aliphatic hydrocarbon, the mixing proportions ensuring the formation of a liquid lactam phase in addition to the hydrocarbon phase;

II. separating off the hydrocarbon phase;

III. recrystallising the dissolved lactam from the hydrocarbon phase by cooling; and IV. subjecting the lactam crystals thus obtained to fractional vacuum distillation.

It has been found that in the catalytic rearrangement of cyclohexanone oxime, small quantities of numerous by-products which have different properties are formed. These by-products can be divided into two groups: one of which resembles lactam in its solubility properties and the other of which has a strong resemblance to hydrocarbons. The process according to the invention makes use of these different properties by forming a diphasic system of lactam and hydrocarbons, in which system the impurities which are readily soluble in lactam are taken up by the liquid lactam phase. The other products dissolved in the hydrocarbon. The quantitative proportions of the two phases are adjusted by suitable choice of quantities and temperatures so that the liquid lactam phase amounts to only a few per cent of the whole mixture. To achieve this, the mixture must be adjusted to a temperature above 65° C, and above 3 to 6 parts of hydrocarbon must be mixed with 1 part of crude lactam. Under these conditions, large quantities of lactam are also dissolved in the hydrocarbon phase.

After the components have been brought together and the solution equilibrium has been adjusted, the phases are separated. Pure lactam crystallises form the hydrocarbon phase on cooling, and, after filtration, this lactam is washed with pure hydrocarbon to remove the mother liquor adhering to it. Although the liquid lactam phase amounts to only a few per cent of the total lactam in the mixture under the conditions mentioned above, it has a relatively high concentration of impurities which can now be substantially removed by simple distillation.

Aliphatic branched hydrocarbons having more than 5 carbon atoms, e.g. 2,3-dimethylbutane, dimethylpentane, trimethylpentane, pentamethylheptane and diethyloctane, are suitable for use as extraction solvents for this purification process. Although hydrocarbons having more than 12 carbon atoms could, in principle, be used, residues of such hydrocarbons are difficult to remove from the crystallised lactam by distillation owing to their high boiling point. Trimethylpentane and isododecane are found to be especially effective.

The temperature at which this purification process is carried out should be sufficiently high to ensure that the lactam phase is liquid. This is generally the case above 65° C, but lower temperatures may be employed if a large amount of impurities is present.

The proportion of hydrocarbons to lactam in the diphasic system may vary within wide limits but a proportion of from 1 to 10 percent of lactam (based on the total lactam) as the liquid phase is generally sufficient to take up the by-products. Other proportions may also be used.

As mentioned above, lactam crystallises from the hydrocarbon phase on cooling. Mother liquor adhering to it is removed by carefully washing it with pure solvents. Various methods may be used for removing the residual hydrocarbon, e.g. by drying of the solid crystals or distillation. The last mentioned method in particular completely removes all traces of solvents and is capable of yielding a very highly purified caprolactam. The first runnings obtained from this distillation can be returned to the process at any stage.

If a continous process is employed, it is advantageous to combine the individual operations described above as follows (the numbers and letters refer to FIG. 1):

Crude lactam and lactam returned from stages C and D are supplied to the mixing apparatus A through pipes 1, 4 and 8. Hydrocarbon is fed in through pipe 7. The mixing apparatus A in which the diphasic mixture is prepared and the by-products become distributed in the phases may be in the form of a vessel equipped with a stirrer with a separating vessel or extraction column attached to it. The apparatus B represents a crystallisation apparatus with separating device for separating solid from liquid, e.g. a plate filter, rotary filter or centrifuge. The mother liquor is discharged through pipe 5. Pure hydrocarbon for washing the crystals is supplied through pipe 6. The washed lactam crystals are distilled in the distillation column C. The first runnings, consisting mainly of hydrocarbon and lactam, is supplied to the mixing apparatus A through pipe 4. Pure lactam is removed through pipe 9.

The lactam phase which is formed in A is processed in the distillation apparatus D. Solvent distils off first and is removed through pipe 10. The next fraction to distil over consists of caprolactam, which is returned to extraction A through pipe 8. A high proportion of the impurities remains in the residue which is removed from the process through pipe 11. The solvent which leaves the process through pipes 5 and 10 is worked up and returned to the process through pipes 6 and 7.

The usual characteristic data were obtained to determine the degree of purity of the caprolactam produced. The Hazen colour number is defined according to ASTM D 1209. The permanganate number indicates the time in seconds after which the colour of a solution of 1 g of $\epsilon$-caprolactam in 100 ml of water is reduced to such an extent by the addition of 1 ml of N/100 $KMnO_4$ that its colour matches that of a standard solution which contains 2.5 g. of $CO(NO_3)_2 \cdot 6 H_2O$ and 0.01 g of $K_2Cr_2O_7$ in 1 litre of water.

The following Examples are to furthe illustrate the invention without limiting it.

Example 1

Two kg of crude lactam which has been obtained by catalytic cyclohexanone oxime rearrangement and which is free from oxime are mixed with 8.4 kg of isooctane at 69° C to 70° C. The two phases are then carefully separated by leaving the mixture to settle for 30 minutes. Caprolactam crystallises from the isooctane phase on cooling. After filtration, this caprolactam is thoroughly washed twice, each time with 0.5 kg of isooctane.

One thousand nine hundred twenty g of moist crystals which have the following characteristics are obtained:

| | |
|---|---|
| Colour number | 5 |
| Volatile base | 0.06 |
| $KMnO_4$ number | 22,000 |

The moist crystals are subjected to fractional vacuum distillation. After removal of the isooctane and a preliminary distillate, caprolactam which has the following characteristics is obtained in the main distillate:

| | |
|---|---|
| Colour number | 5 |
| Volatile base | 0.06 |
| $KMnO_4$ number | >30,000 |
| UV number | 95 |

Example 2

24.1 kg of crude lactam were extracted in countercurrent with 100 kg of isododecane in a column of filling bodies heated to 70° C. 2.5 kg of a lactam phase remain behind. 25.0 kg of moist caprolactam crystallise from the isododecane on cooling. This caprolactam is removed by suction filtration and washed twice with dodecane. The moist lactam has the following chracteristics:

| | |
|---|---|
| Colour number | 50 |
| Volatile base | 0.12 |
| $KMnO_4$ number | 20,800 |

After distillation under the conditions indicated in Example 1, the caprolactam is found to have the following characteristics:

| | |
|---|---|
| Colour number | 5 |
| Volatile base | 0.08 |
| $KMnO_4$ number | >30,000 |
| UV number | 96 |

We claim:

1. A process for the purification of $\epsilon$-caprolactam prepared by catalytic cyclohexanone oxime rearrangment in the gaseous phase comprising:
   I. mixing the crude lactam at a temperature above its melting point with at least one branched aliphatic hydrocarbon, the mixing proportions ensuring the formation of a liquid lactam phase in addition to the hydrocarbon phase;
   II. separating off the hydrocarbon phase;
   III. recrystallising the dissolved lactam from the hydrocarbon phase by cooling; and
   IV. subjecting the lactam crystals thus obtained to fractional vacuum distillation.

2. A process as claimed in claim 1, wherein the hydrocarbon is trimethylpentane.

3. A process as claimed in claim 1, wherein the hydrocarbon is isododecane.

4. A process as claimed in any of claims 1 to 3, wherein the crude lactam is mixed with the hydrocarbon at a temperature above 65° C.

* * * * *